G. JOHNSON.
MANUFACTURE OF HEXAGONAL NUTS.
No. 171,023. Patented Dec. 14, 1875.
fig: 1.
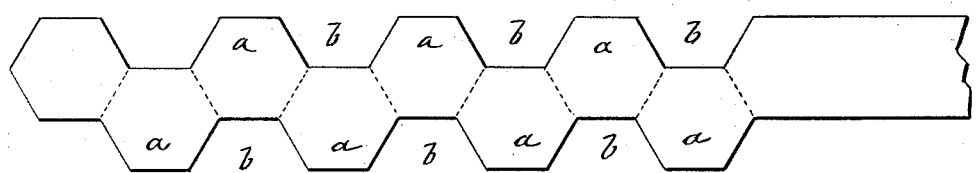
fig: 2.
WITNESSES:
Chas. Nida
Alex. F. Roberts
INVENTOR:
G. Johnson
BY Munn & Co.
ATTORNEYS.

UNITED STATES PATENT OFFICE.

GEORGE JOHNSON, OF HAVERSTRAW, NEW YORK.

IMPROVEMENT IN THE MANUFACTURE OF HEXAGONAL NUTS.

Specification forming part of Letters Patent No. 171,023, dated December 14, 1875; application filed November 13, 1875.

*To all whom it may concern:*

Be it known that I, GEORGE JOHNSON, of Haverstraw, in the county of Rockland and State of New York, have invented a new and useful Improvement in Manufacture of Hexagon Nuts, of which the following is a specification:

In the accompanying drawing, Figure 1 represents a top view of my improved bar for making hexagon nuts, and Fig. 2 shows the straight bar hitherto employed for making these nuts.

Similar letters of reference indicate corresponding parts.

My invention relates to an improved method of making hexagon nuts, by which a stronger nut is obtained, any waste of iron in cutting avoided, and a convenient feeding of the bar to the nut-cutting machine is produced.

The invention consists in passing the straight blank bar through rolls or dies, and forcing it into such shape that alternating semi-hexagonal projections and recesses at both sides are produced, but that the recesses at one side are parallel and corresponding to the projections at the other side. The bar is fed in this shape on its edge to the nut-machine, being turned after each cutting of the same to bring the nuts always into the same position for the tool.

Hitherto the screw-nuts of hexagonal shape were cut from straight bars, as shown in Fig. 2, which mode produces a great waste of iron at the sides in the form of small triangular pieces, and disturbs the fiber of the iron, requiring also the frequent sharpening of the cutting-tools, as there are for each nut four cutting-planes. To avoid this I feed the straight bars through suitable rolls or dies, by which the iron is forced alternately in semi-hexagonal shape from one side to the other, producing thereby the form shown in Fig. 1, with alternating projections *a* and groove *b* of semi-hexagonal shape, the grooves of either side being parallel to and extending into the projecting parts of the other sides. The fiber of the iron bar is thereby changed from a straight line to an undulating line following the outer edges of the bar. The curved fibers make the nut much stronger than those made in the old way, and utilize thereby the entire bar for nuts, as no waste pieces of iron are cut off. The hexagonally-shaped bar may be fed to the nut-cutting machine on the edge, being turned over after the cutting of each nut, so that the next nut is always in the same position to the cutting-tool. As there is only one cuttting-plane for each nut, the cutters are worn less, so that considerable saving in time and labor is produced.

Having thus described my invention, I claim as new, and desire to secure by Letters Patent—

1. The method herein described of manufacturing hexagon nuts by forcing or shaping the bar by dies or rolls to form alternating semi-hexagonal projections and recesses, and admit the cutting-off of the nuts at one cutting-plane only, substantially as and for the purpose set forth.

2. A blank or bar for making hexagon nuts, made with alternating semi-hexagonal projections and recesses at both sides, substantially as specified.

GEORGE JOHNSON.

Witnesses:
 PAUL GOEPEL,
 ALEX. F. ROBERTS.